Dec. 24, 1963 R. S. OTHON 3,115,235

DIODE ORIENTING APPARATUS

Filed Oct. 29, 1962 2 Sheets-Sheet 1

RALPH S. OTHON,
INVENTOR.

BY HIS ATTORNEYS.

Spensley & Horn

RALPH S. OTHON,
INVENTOR.

BY HIS ATTORNEYS

Spensley & Horn

United States Patent Office 3,115,235
Patented Dec. 24, 1963

3,115,235
DIODE ORIENTING APPARATUS

Ralph S. Othon, Los Angeles, Calif., assignor to Pacific Semiconductors, Inc., Lawndale, Calif., a corporation of Delaware Filed Oct. 29, 1962, Ser. No. 233,584
11 Claims. (Cl. 198—33)

This invention relates to asymmetrically conducting electronic devices and more particularly to an apparatus for automatically orienting the same.

This invention will be described in connection with the orientation of semiconductor diodes for purposes of example only, it being equally applicable to other asymmetrically electrically conducting devices as well as other two-ended devices. In the manufacture and handling of semiconductor diodes, it is often desirable to present the diodes in a predetermined physical alignment and all oriented in the same direction with respect to their direction of easy conduction, called the forward direction. For example, semiconductor diodes of the form wherein electrical leads extend coaxially from opposite ends of a tubular body, being symmetrical in configuration, are usually marked or color coded to indicate the direction of forward current conduction. When manufacturing such diodes on a mass production basis, the diodes must be all fed in the same orientation to a color coding machine so that the color coding will be uniform and constant. At the present state of the art this diode orientation is usually manually accomplished, an operator individually testing each diode and then manually orienting the diodes by turning them end-for-end, when necessary. It is apparent that such manual inspection and sorting of the diodes is slow and costly. It is therefore desirable to provide an apparatus employing automatic means for sensing the orientation of the diodes so that a relatively large number of randomly oriented diodes can be quickly and efficiently tested and those diodes which are not oriented in the desired direction automatically realigned in the proper orientation.

The apparatus of the present invention is so constructed and arranged to receive a plurality of randomly oriented diodes of a particular configuration to individually sense their orientation, and to automatically align the diodes all with the same orientation and emit them in a particular alignment.

It is therefore an object of the present invention to automatically arrange in a predetermined direction a plurality of randomly oriented devices having a front and a back end.

It is another object of the present invention to automatically arrange a plurality of randomly oriented asymmetrically conducting electrical devices in a predetermined orientation.

It is a further object of the present invention to automatically orient a plurality of randomly oriented semiconductor diodes to place the diodes in a predetermined alignment and in orientation with respect to their direction of conduction.

A still further object of the present invention is to automatically and individually test each of a plurality of randomly oriented semiconductor diodes and to reverse the orientation of those diodes which are not oriented in a predetermined direction.

It is also an object of the present invention to automatically and individually test each of a plurality of semiconductor asymmetrically conducting devices and to automatically reject those devices which are electrically shorted or open.

The objects of the present invention are generally accomplished by apparatus which functions to feed the randomly oriented devices in parallel alignment to a test station wherein their electrical orientation is electronically sensed, the apparatus automatically turning end-for-end those devices which are not oriented in the desired direction, and feeding all of the devices to an output channel. In accordance with a presently preferred embodiment of the present invention apparatus, there is provided a feeder means consisting of an angularly inclined guideway which drops the devices in spaced apart parallel alignment onto the surface of a rotating feeder wheel, each of the devices being disposed in a suitable indentation in the periphery of the wheel. Rotation of the feeder wheel carries the devices to a test station near the bottom of the wheel, arcuate guide means positioned adjacent the wheel preventing the devices from falling out of the indentations before they reach the test station. At the test station, there are positioned spaced apart electrical contacts in the form of leaf springs which, by their spring force, maintain the devices within the indentations in the feeder wheel as each device passes through the test station. Electronic sensing means coupled to the leaf spring contacts provide different outputs depending upon the orientation of each device as it is presented to the test station. Upon leaving the test station due to further continual rotation of the feeder wheel, the device is no longer restrained from falling from the peripheral surface of the wheel. Assuming the device was oriented in the desired direction as it passed through the test station, the output of the electrical sensing means actuates a solenoid which momentarily positions a first device directing means beneath the wheel to catch the diode as it leaves the test station. Upon catching the device, the first device directing means moves away to a different position where the device is ejected into the inlet of an output channel. However, if the device is presented to the test station oriented oppositely to the desired orientation, the output of the electrical sensing means energizes a different solenoid to momentarily position a second device directing means beneath the wheel to catch the device as it leaves the test station. Upon catching the device, the second device directing means moves away from its loading position beneath the wheel and during the movement it turns the device end-for-end and ejects it into another inlet of the output channel. Hence, all of the devices entering the output channel will be oriented in the proper direction.

The novel features which are believed to be characteristic of the invention, both as to its organization and method of operation, together with further objects and advantages thereof will be better understood from the following description considered in connection with the accompanying drawings in which a presently preferred embodiment of the invention is illustrated by way of example. It is to be expressly understood, however, that the drawings are for the purpose of illustration and description only, and are not intended as a definition of the limits of the invention.

Figure 1:
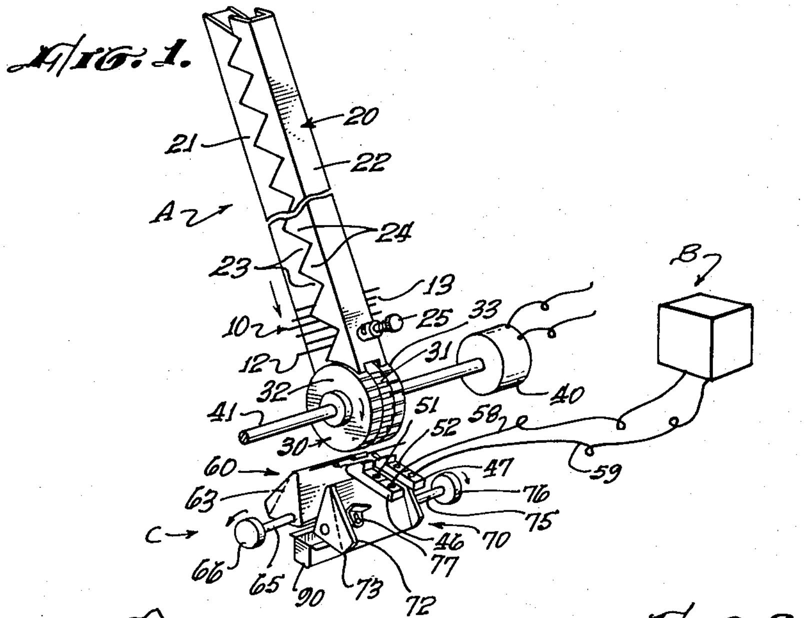
FIGURE 1 is a perspective view showing the relative positioning of the major components of the present invention apparatus.

Referring now to the drawings, and more particularly to FIGURE 1, there is shown a presently preferred embodiment of the apparatus in accordance with the present invention which includes feeder means A for receiving a plurality of randomly oriented diodes and transporting them in parallel alignment to a test station, electronic sensing means B to determine the direction of conduction of a diode at the test station, and electromechanical sorting means C, controlled by the electronic sensing means, for orienting the diodes in a predetermined alignment with respect to their direction of conduction.

Figure 3:
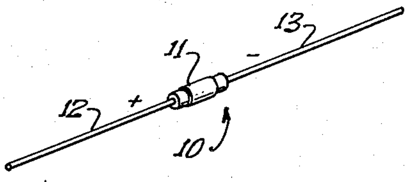
FIGURE 3 is a perspective view of a typical diode suitable for insertion into the present invention apparatus.
Figure 4:
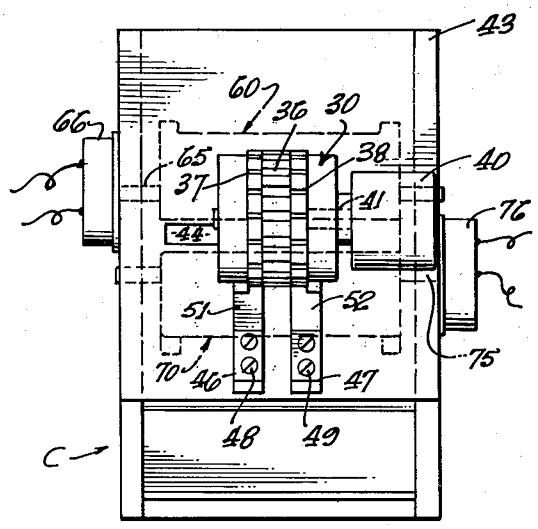
FIGURE 4 is a view taken along the line 4—4 of FIGURE 2.

For the purposes of clarity and illustration, FIGURE 3 of the drawing shows a diode 10 of a particular construction. The semiconductor device forming the heart of the diode 10 is packaged in a cylindrical body 11 having electrical leads 12 and 13 coaxially projecting from opposite ends thereof. Although the illustrated embodiment of the present invention apparatus is shown for use with semiconductor diodes having the configuration of the diode 10, the apparatus is usable, with only slight modifications where necessary, for use with diodes or other electrical components having electrical leads or electrodes projecting from opposite ends of a main body portion. For example, certain types of semiconductor diodes are encapsulated within a ceramic tube having electrode pins inserted into opposite ends of the tube. The necessary modifications to the illustrated apparatus to enable its use with this last-mentioned type of semiconductor diode and with electrical components of other configurations will become apparent to those skilled in the art.

In FIGURES 1, 2, 4 and 8 of the drawings, there are shown various views of the feeder means A. The feeder means A consists generally of an inclined guideway 20 and a feeder wheel 30. The guideway 20 is formed of two channel sections 21 and 22, the longitudinal flanges of which are provided with respective series of triangular projections 23 and 24. The channels are mounted so that the flanges face each other with the projections 23 and 24 in mating alignment but spaced apart from each other a distance slightly greater than the thickness of the electrical leads 12 and 13 on the diode 10. The web of the channel sections 21 and 22 is of sufficient length to accommodate the cylindrical body 11 of the diodes so that the diodes will pass down the guideway while being maintained in substantially parallel alignment. Diodes are fed into the uppermost inlet end of the guideway 20 in parallel alignment but random orientation by any suitable means. For example, the diodes may be conveniently fed into the guideway inlet by the well-known Syntron parts feeder. Mounted to the web of the channel section 22, near the lowermost outlet end of the inclined guideway 20, is a spring loaded plunger 25. The plunger 25 can be manually urged into the guideway and there locked into position by suitable detent means, not shown, to halt the flow of diodes through the guideway if desired. The lowermost surface of the inclined guideway 20 is defined by the end surfaces of the channel sections 21 and 22, the lower guideway surface being arcuate in form and generally indicated by the reference numeral 27.

Figure 8:
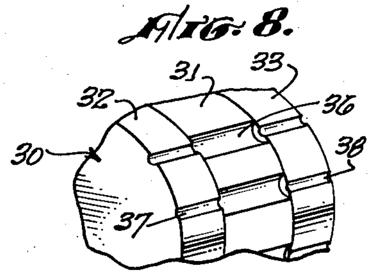
FIGURE 8 is a perspective view showing a portion of the peripheral surface of the feeder wheel.

The feeder wheel 30 is of laminated construction ,as can best be seen from the fragmentary view of FIGURE 8, and comprises a central disc 31 is disposed between thin discs 32 and 33. The width of the central disc 31 is slightly in excess of the length of the cylindrical body 11 of the diode 10, the central disc containing a plurality of radially spaced transverse slots 36. The slots 36 are semicylindrical in shape and of a diameter slightly greater than the diameter of the cylindrical body 11 of the diode 10. The thin discs 32 and 33 are substantially identical and contain a plurality of radially spaced transverse slots 37 and 38. The slots 37 and 38 are substantially identical and are of semicylindrical shape with a diameter slightly in excess of the diameter of the electrical leads 12 and 13 of the diode 10. The slots 37 and 38 are disposed in coaxial alignment with the slots 36 in the central disc so that the aligned slots will form an indentation shaped to receive a diode 10 and maintain it in transverse alignment to the feeder wheel 30. The feeder wheel 30 is mounted for rotation about a horizontal axis, as will be explained hereinbelow. Due to the close spacing of the arcuate lower surface 27 of the aligned guideway 20 from the slotted peripheral surface of the feeder wheel 30, a diode 10 will be discharged from the inclined guideway only when a transversely slotted portion of the feeder wheel passes directly beneath the diode so that the diode can drop into the indentation and clear the arcuate surface 27. Therefore, the diodes 10 contained in the inclined guideway 20 are automatically discharged onto the peripheral surface of the feeder wheel 30 at predetermined intervals determined by the radial spacing of the transverse indentations in the peripheral surface of the feeder wheel. An arcuately formed guideplate 39 (see FIGURE 2) is disposed adjacent the peripheral surface of the feeder wheel to prevent diodes contained within the transverse indentations of the wheel from being ejected or from falling from the wheel before the diodes reach the test station.

The feeder wheel 30 is mounted on the shaft 41 of an electrical motor 40, driven from a suitable source of electricity, not shown. The shaft 41 is horizontally oriented so that the feeder wheel 30 rotates in a vertical plane directly beneath the inclined guideway 20. The motor 40 is mounted to a horizontal support surface 43, such as a table or the like. The support surface 43 defines an opening or gap 44, the feeder wheel 30 being disposed directly over one edge of the gap as can best be seen in FIGURE 2.

Mounted to the supporting surface 43, by means of support blocks 46 and 47 are a pair of electrical leaf spring contacts 51 and 52. The leaf spring contact 51 is secured to the support block 46 by means of screws 48. The leaf spring contact 52 is secured to the support block 47 by means of a screw 48, the leaf spring contact 52 being secured to the support block 47 by means of a screw 49. Screw mounting of the leaf spring contacts 51 and 52 enables their rapid and convenient replacement upon excessive wear or for cleaning purposes.

Figure 2:
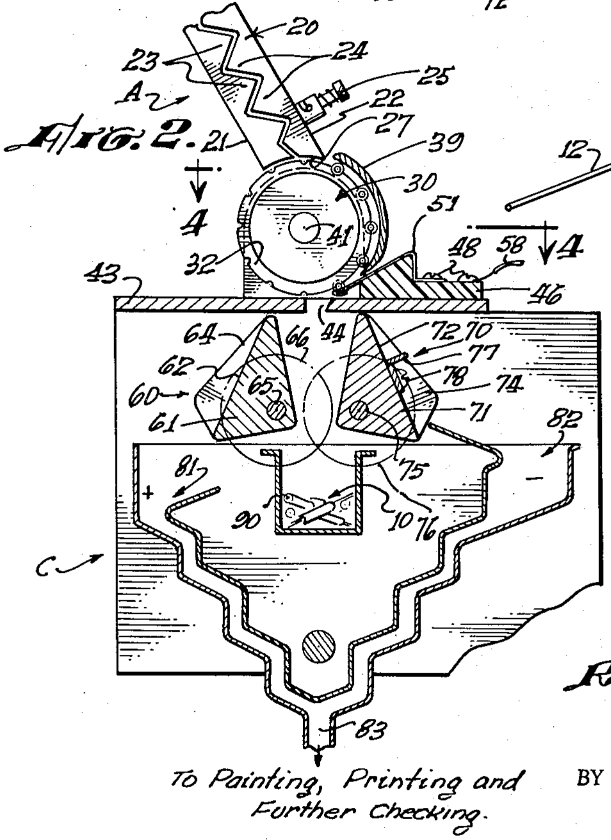
FIGURE 2 is an end view, partly in section, showing the present invention apparatus in operation.

As can best be seen in FIGURE 2, one end of the leaf spring contact 51 projects from the support block 46 and forms a spring arm having a contact surface at the tip thereof. One end of the leaf spring contact 52 similarly projects from the support block 47 and forms a spring arm terminating in a contact surface. The leaf spring contacts 51 and 52 are positioned in substantial alignment with the thin discs 32 and 33 of the feeder wheel 30 with their contact surfaces and being in close proximity to the peripheral surface of the feeder wheel between the gap 44 and the lower end of the arcuate guide plate 39. Thus, diodes fed onto the feeder wheel 30 from the inclined guideway 20 are carried by the feeder wheel into contact with the contact surfaces of the spring contacts 51 and 52, the diodes being prevented from falling out of the indentations in the feeder wheel first by the guide plate 39 and then by the spring arms of the contacts 51 and 52. Upon rotation of the feeder wheel 30, the diode leaving the contact surfaces of the spring contacts no longer maintained within the indentation in the peripheral surface of the feeder wheel and so falls by gravity through the gap 44 in the support surface 43, the falling diode being disposed of in a manner to be hereinafter explained.

The leaf spring contacts 51 and 52 are connected by electrical leads 58 and 59 to the electronic sensing means B, which determines the direction of electrical orientation of the diode in contact with the contact surfaces of the spring contacts, the electronic sensing means B then providing an electircal output pulse representative of the particular orientation of the diode to control the electromechanical sorting means C described hereinbelow. Thus, the diodes being carried by the rotating feeder wheel 30 pass through the test station at which the contact surfaces of the leaf spring contacts 51 and 52 are positioned and then are ejected by gravitational force through the gap 44 in the support surface 43.

Figure 5:
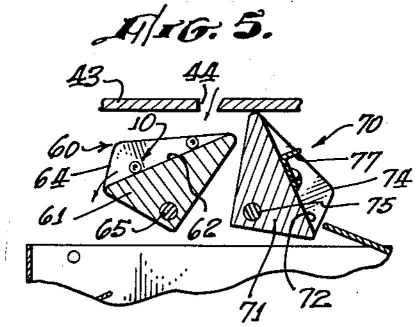
FIGURE 5 is a partial end view showing a first chute in its loading position and a second chute in a discharge position.

The electromechanical sorting means C consists primarily of a pair of rotatably mounted diode directing means in the form of chutes 60 and 70 disposed beneath the support surface 43, and a dual inlet channel means 80 disposed beneath the chutes 60 and 70. The chute 60 consists of a block of solid material 61 of generally triangular cross section, the block 61 having a planar side surface 62 of rectangular configuration. Mounted transversely at either end of the block 61 are irregularly shaped end plates 63 and 64, a portion of each of the end plates projecting beyond the planar surface 62 to define a chute for guidance of diodes dropped thereon. The chute 60 is affixed to a horizontal shaft 65 which extends longitudinally through the block 61. The shaft is rotatably supported beneath the support surface 43 at one side of the gap 44. Affixed to the end of the shaft 65 projecting forwardly from the block 61 is a rotary solenoid 66, the solenoid being connected to the electronic sensing means B and being controlled by the electrical output signals thereof. With the solenoid 66 de-energized, the chute 61 is maintained in the position shown in FIGURE 2 by the force of a coil spring, not shown. Upon actuation of the solenoid 66, the chute 60 rotates in a clockwise direction to the position shown in FIGURE 5, wherein a portion of the chute is disposed directly beneath the gap 44 in the support surface 43. Upon de-energization of the solenoid 66, the coil spring force returns the chute to the position shown in FIGURE 2.

Figure 6:
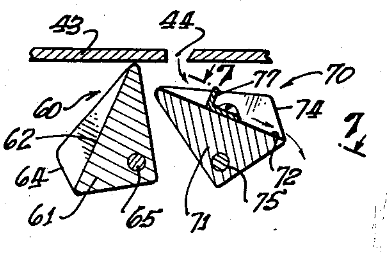
FIGURE 6 is a partial end view showing the first chute in its discharge position and the second chute in its loading position.
Figure 7:
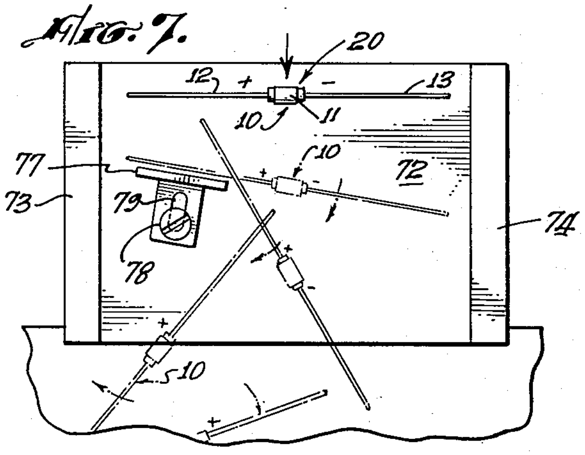
FIGURE 7 is a view taken along the line 7—7 of FIGURE 6.

The chute 70 is similar in construction to that of the chute 60, the chute 70 including a triangular block 71 having a planar side surface 72 and generally rectangular end plates 73 and 74 projecting beyond the planar surface 72. The block 72 is affixed to a horizontal shaft 75 and is positioned beneath the support surface 43 on the other side of the gap 44 from the chute 60. Affixed to the rearwardly projecting end of the shaft 75 is a rotary solenoid 76, energization of the solenoid 76 by the electronic sensing means B causing counter-clockwise rotation of the chute 70 from the position shown in FIGURE 2 to the position shown in FIGURE 6. The chute 70 differs in construction from that of the chute 60 by the mounting of a projecting baffle 77 to the planar surface 72 by means of a screw 78 extending through a slot 79 as can best be seen in FIGURE 7. The baffle 77 is angularly positioned on the surface 72 near the end plate 73 to engage the projecting lead of a diode dropped into the chute to cause the diode to be flipped end-for-end as it falls through the chute, as is shown by the sequential series of phantom pictures in FIGURE 7.

As shown in FIGURE 2, a reject container 90 is positioned beneath the chutes 60 and 70 and in direct vertical alignment with the gap 44 to catch any diodes falling through the gap when neither of the solenoids 66 or 76 are energized. The channel means 80 has a first inlet 81 positioned adjacent the lower end of the chute 60 and a second inlet 82 positioned adjacent the lower end of the chute 70. The inlets 81 and 82 empty into a common channel 83, the channel 83 serving to transport the diodes out of the apparatus.

The electronic sensing means B will now be described primarily in terms of its function. Electrical circuitry to perform the desired functions is well known in the art and hence will not be discussed in detail. An explanation of typical electrical circuitry for use in diode orienting aparatus can be found in U.S. Patent No. 2,975,878, entitled "Apparatus for Physically Orienting Electrically Asymmetrical Devices," issued on March 21, 1961, to P. B. Cason. In FIGURE 14 of the drawing of the Cason patent there is shown suitable basic circuitry which is readily adaptable for use in the present invention, the illustrated circuitry functioning to selectively energize one of two solenoids, depending upon the electrical orientation of a diode presented to a test station. It will be readily apparent to those skilled in the art how various portions of the circuitry disclosed in the Curry patent can be adapted to perform the various functions of the present invention electronic sensing means B. The primary function of the electronic sensing means B is to sense the electrical orientation of diodes presented to the test station of the apparatus and to produce output signal pulses which control the various solenoids to insure that the diode will enter the common channel 83 in a predetermined orientation. It will be remembered that although the diodes are fed in parallel alignment onto the peripheral surface of the rotating feeder wheel 30, the diodes are randomly oriented with respect to their electrical conduction characteristics. Thus, any diode appearing at the test station may be oriented in one or the other direction with respect to its direction of conduction, i.e., either in the forward or reverse direction. Assuming that it is desired to feed all the diodes into the common channel 83 oriented in the forward (+) direction, it is apparent that a diode which is presented to the test station oriented in a reverse (−) direction must be turned over end-for-end before being inserted into the channel 83. Therefore, the electronic sensing circuit B functions to energize the solenoid 66 if the diode presented at the test station is oriented in the forward direction, and to energize the solenoid 76 if the diode presented at the test station is oriented in the reverse direction. Also, if the particular diode being tested is electrically short-circuited or open due to an internal defect then, since the electronic sensing means B cannot determine a forward or reverse orientation, neither of the solenoids 66 or 76 will be energized and that particular diode will be allowed to fall into the reject container 90.

In operation, the feeder wheel 60 rotates continuously, the individual diodes passing through the test station at a predetermined speed rather than being stopped at the test station for testing. As a particular diode is carried by the feeder wheel 30 to the test station, its electrical leads are brought into contact with electrical contact surfaces of the electrical contacts 51 and 52 whereupon the electronic sensing means B determines its electrical orientation. If the diode is oriented in the positive direction, the electronic sensing means B momentarily energizes the solenoid 66 to cause clockwise rotation of the chute 60 to the position shown in FIGURE 5. The solenoid 66 is maintained in an energized condition for a predetermined small length of time after the diode under tests leaves the testing station and is no longer in contact with the contact surfaces 54 and 57, the predetermined small amount of time being sufficient to enable the diode to drop through the gap 44 and into the chute 60. This predetermined small time interval is dependent upon the speed of rotation of the feeder wheel 30 and is easily achievable, such as by an R-C discharge circuit, for example. Upon falling into the chute 60, the diode begins to roll down the chute and upon subsequent de-energization of the solenoid 66 and return of the chute to the position shown in FIGURE 2, the diode will be ejected into the inlet 81 and thence travel down the inlet and into the common channel 83.

Suppose, on the other hand, that a particular diode fed to the test station is oriented in the reverse direction. Upon sensing the reverse orientation, the electronic sensing means B functions to momentarily energize the solenoid 76 to cause counter-clockwise rotation of the chute 70 to the position in FIGURE 6, the solenoid 76 being maintained energized for a sufficient time to enable the diode to leave the test station and fall through the gap 44 and into the chute 70. Upon falling into the chute 70, the diode begins to travel down the chute. However, one of its electrical leads contacts the baffle 77 and is restrained in movement, the weight of the diode causing it to pivot about the baffle 77. As the diode is pivoting about the baffle 77, the solenoid 76 becomes de-energized and the chute 70 returned to the position shown in FIGURE 2, the clockwise rotation of the chute 70 accelerating the rotary movement of the diode contained therein and causing it to flip end-for-end as it is ejected into the inlet 82. Upon flipping end-for-end, the diode is reversed in orientation and enters the common channel 83 oriented in the positive direction. The mounting of the baffle 77 by means of the slot 79 enables the angular position of the baffle to be adjusted to achieve the desired rotational force sufficient to flip the diode end-for-end before it enters the channel inlet 82.

As mentioned hereinabove, should a short-circuited or open diode be presented to the test station, the electronic sensing means B will be unable to determine an electrical orientation for the diode and hence neither of the chutes will be rotated into its loading position since neither of the solenoids will be energized, and the chutes will be maintained in the position shown in FIGURE 2. Upon subsequent rotation of the wheel and dropping of the diode through the gap 44, the diode's fall will be unimpeded by a chute and the diode will enter the reject container 90 positioned directly beneath the gap 44. Thus, during normal operation either one or the other, or neither, of the chutes will be positioned beneath the gap 44 as a diode drops through. Upon proper synchronization of the rotational forces of the solenoids and the coil return springs associated therewith, in conjunction with the speed of rotation of the feeder wheel 30, a fairly rapid feed rate can be achieved. In practice, a feed rate on the order of 3,600 diodes per hour is easily achievable.

Although the invention has been described with a certain degree of particularity, it is understood that the present disclosure has been made only by way of example and that numerous changes in the details of construction and the combination and arrangement of parts may be resorted to without departing from the spirit and the scope of the invention as hereinafter claimed.

What is claimed is:

1. Apparatus for orienting a plurality of similarly packaged semiconductor diodes to place the diodes in a predetermined alignment and in a desired orientation with respect to their direction of conduction, said apparatus comprising:

(*a*) feeder means for receiving said diodes and transporting them in spaced apart parallel alignment along a predetermined path from a first predetermined point to a second predetermined point, said feeder means including an inclined guideway and a feeder wheel, said inclined guideway having an uppermost inlet disposed at said first predetermined point and a lowermost outlet disposed adjacent the peripheral surface of said feeder wheel, said feeder wheel being rotated about a horizontal axis and being positioned directly beneath the outlet of said inclined guideway and above said second predetermined point, the peripheral surface of said feeder wheel including a plurality of radially spaced indentations, each of said indentations being adapted for the reception of one of said diodes;

(*b*) electrical contact means positioned at a test station along said predetermined path near said second predetermined point to establish electrical contact with diodes being transported by said feeder means as they pass through said test station:

(*c*) electronic sensing means coupled to said electrical contact means to determine the direction of conduction of a diode at said test station, said electronic sensing means producing a first predetermined electrical output when the diode at said test station is oriented in one direction with respect to its direction of conduction and a second predetermined electrical output when the diode at said test station is oriented in the other direction with respect to its direction of conduction;

(*d*) generally arcuate guide means extending partially around the periphery of said feeder wheel from said test station toward the outlet of said inclined guideway to prevent diodes disposed within the indentations in the peripheral surface of said feeder wheel from falling therefrom while being transported to said test station;

(*e*) first diode directing means rotatably mounted adjacent said second predetermined point for rotation about a substantially horizontal axis to said second predetermined point for a predetermined short time interval in response to the first predetermined electrical output of said electronic sensing means to receive a diode gravitationally discharged from said feeder wheel at said second predetermined point and to eject the diode at a third predetermined point without altering the particular orientation of the diode, said first diode directing means including first rotary solenoid means coupled to said electronic sensing means for selective energization by said first predetermined electrical output;

(*f*) second diode directing means rotatably mounted adjacent said second predetermined point for rotation about a substantially horizontal axis to said second predetermined point for a predetermined short time interval in response to the second predetermined electrical output of said electronic sensing means to receive a diode gravitationally discharged from said feeder wheel at said second predetermined point and to eject the diode at a fourth predetermined point, said second diode directing means being adapted to reverse the orientation of a diode disposed therein during movement of said diode between said second and fourth predetermined points, said second diode directing means including second rotary solenoid means coupled to said electronic sensing means for selective energization by said second predetermined electrical output; and, (*g*) a dual inlet channel means for discharge of diodes from said apparatus in the desired orientation, said channel means having a first inlet positioned at said third predetermined point for reception of diodes ejected from said first diode directing means, said channel means having a second inlet positioned at said fourth predetermined point for reception of diodes ejected from said second diode directing means, said channel means being adapted to maintain the alignment and orientation of diodes fed to its inlets.

2. Apparatus for orienting a plurality of similarly packaged semiconductor diodes to place the diodes in a predetermined alignment and in a desired orientation with respect to their direction of conduction, said apparatus comprising:

(*a*) feeder means for receiving said diodes and transporting them in spaced apart parallel alignment along a predetermined path from a first predetermined point to a second predetermined point, said feeder means including an inclined guideway and a feeder wheel, said inclined guideway having an uppermost inlet disposed at said first predetermined point and a lowermost outlet disposed adjacent the peripheral surface of said feeder wheel, said feeder wheel being rotated about a horizontal axis and being positioned directly beneath the outlet of said inclined guideway and above said second predetermined point, the peripheral surface of said feeder wheel including a plurality of radially spaced indentations, each of said indentations being adapted for the reception of one of said diodes;

(*b*) electrical contact means positioned at a test station along said predetermined path near said second predetermined point to establish electrical contact with diodes being transported by said feeder means as they pass through said test station;

(c) electronic sensing means coupled to said electrical contact means to determine the direction of conduction of a diode at said test station, said electronic sensing means producing a first predetermined electrical output when the diode at said test station is oriented in one direction with respect to its direction of conduction and a second predetermined electrical output when the diode at said test station is oriented in the other direction with respect to its direction of conduction;

(d) generally arcuate guide means extending partially around the periphery of said feeder wheel from said test station toward the outlet of said inclined guideway to prevent diodes disposed within the indentations in the peripheral surface of said feeder wheel from falling therefrom while being transported to said test station;

(e) first diode directing means movably mounted adjacent said second predetermined point for selective movement to said second predetermined point for a predetermined short time interval in response to the first predetermined electrical output of said electronic sensing means to receive a diode from said feeder means upon movement of the diode from said test station to said second predetermined point and to eject the diode at a third predetermined point without altering the particular orientation of the diode, said first diode directing means including first solenoid means coupled to said electronic sensing means for selective energization by said first predetermined electrical output;

(f) second diode directing means movably mounted adjacent said second predetermined point for selective movement to said second predetermined point for a predetermined short time interval in response to the second predetermined electrical output of said electronic sensing means to receive a diode from said feeder means upon movement of the diode from said test station to said second predetermined point and to eject the diode at a fourth predetermined point, said second diode directing means being adapted to reverse the orientation of a diode contained therein during movement of the diode between said second and fourth predetermined points, said second diode directing means including second solenoid means coupled to said electronic sensing means for selective energization by said second predetermined electrical output; and (g) a dual inlet channel means for discharge of diodes from said apparatus in the desired orientation, said channel means having a first inlet positioned at said third predetermined point for reception of diodes ejected from said first diode directing means, said channel means having a second inlet positioned at said fourth predetermined point for reception of diodes ejected from said second diode directing means, said channel means being adapted to maintain the alignment and orientation of diodes fed to its inlets.

3. Apparatus for orienting a plurality of similarly packaged semiconductor diodes to place the diodes in a predetermined alignment and in a desired orientation with respect to their direction of conduction, said apparatus comprising:

(a) feeder means for receiving said diodes and transporting them in spaced apart parallel alignment along a predetermined path from a first predetermined point to a second predetermined point, said feeder means including an inclined guideway and a feeder wheel, said inclined guideway having an uppermost inlet disposed at said first predetermined point and a lowermost outlet disposed adjacent the peripheral surface of said feeder wheel, said feeder wheel being rotated about a horizontal axis and being positioned directly beneath the outlet of said inclined guideway and above said second predetermined point, the peripheral surface of said feeder wheel including a plurality of radially spaced indentations, each of said indentations being adapted for the reception of one of said diodes;

(b) electrical contact means positioned at a test station along said predetermined path near said second predetermined point to establish electrical contact with diodes being transported by said feeder means as they pass through said test station;

(c) electronic sensing means coupled to said electrical contact means to determine the direction of conduction of a diode at said test station, said electronic sensing means producing a first predetermined electrical output when the diode at said test station is oriented in one direction with respect to its direction of conduction and a second predetermined electrical output when the diode at said test station is oriented in the other direction with respect to its direction of conduction;

(d) first diode directing means movably mounted adjacent said second predetermined point for selective movement to said second predetermined point for a predetermined short time interval in response to the first predetermined electrical output of said electronic sensing means to receive a diode from said feeder means upon movement of the diode from said test station to said second predetermined point and to eject the diode at a third predetermined point without altering the particular orientation of the diode, said first diode directing means including first solenoid means coupled to said electronic sensing means for selective energization by said first predetermined electrical output;

(e) second diode directing means movably mounted adjacent said second predetermined point for selective movement to said second predetermined point for a predetermined short time interval in response to the second predetermined electrical output of said electronic sensing means to receive a diode from said feeder means upon movement of the diode from said test station to said second predetermined point and to eject the diode at a fourth predetermined point, said second diode directing means being adapted to reverse the orientation of a diode contained therein during movement of the diode between said second and fourth predetermined points, said second diode directing means including second solenoid means coupled to said electronic sensing means for selective energization by said second predetermined electrical output; and, (f) a dual inlet channel means for discharge of diodes from said apparatus in the desired orientation, said channel means having a first inlet positioned at said third predetermined point for reception of diodes ejected from said first diode directing means, said channel means having a second inlet positioned at said fourth predetermined point for reception of diodes ejected from said second diode directing means, said channel means being adapted to maintain the alignment and orientation of diodes fed to its inlets.

4. Apparatus for orienting a plurality of similarly packaged semiconductor diodes to place the diodes in a predetermined alignment and in a desired orientation with respect to their direction of conduction, said apparatus comprising:

(a) feeder means for receiving said diodes and transporting them from a first predetermined point to a second predetermined point;

(b) electrical contact means positioned at a test station along said predetermined path near said second predetermined point to establish electrical contact with diodes being transported by said feeder means as they pass through said test station;

(c) electronic sensing means coupled to said electrical contact means to determine the direction of conduction of a diode at said test station, said electronic sensing means producing a first predetermined electrical output when the diode at said test station is oriented in one direction with respect to its direction of conduction and a second predetermined electrical output when the diode at said test station is oriented in the other direction with respect to its direction of conduction;

(d) first diode directing means movably mounted adjacent said second predetermined point for selective movement to said second predetermined point for a predetermined short time interval in response to the first predetermined electrical output of said electronic sensing means to receive a diode from said feeder means upon movement of the diode from said test station to said second predetermined point and to eject the diode at a third predetermined point without altering the particular orientation of the diode, said first diode directing means including first solenoid means coupled to said electronic sensing means for selective energization by said first predetermined electrical output;

(e) second diode directing means movably mounted adjacent said second predetermined point for selective movement to said second predetermined point for a predetermined short time interval in response to the second predetermined electrical output of said electronic sensing means to receive a diode from said feeder means upon movement of the diode from said test station to said second predetermined point and to eject the diode at a fourth predetermined point, said second diode directing means being adapted to reverse the orientation of a diode contained therein during movement of the diode between said second and fourth predetermined points, said second diode directing means including second solenoid means coupled to said electronic sensing means for selective energization by said second predetermined electrical output; and, (f) a dual inlet channel means for discharge of diodes from said apparatus in the desired orientation, said channel means having a first inlet positioned at said third predetermined point for reception of diodes ejected from said first diode directing means, said channel means having a second inlet positioned at said fourth predetermined point for reception of diodes ejected from said second diode directing means, said channel means being adapted to maintain the alignment and orientation of diodes fed to its inlets.

5. Apparatus for orienting a plurality of similarly packaged semiconductor diodes to place the diodes in a predetermined alignment and in a desired orientation with respect to their direction of conduction, said apparatus comprising:

(a) feeder means for receiving said diodes and transporting them from a first predetermined point to a second predetermined point;

(b) electrical contact means positioned at a test station along said predetermined path near said second predetermined point to establish electrical contact with diodes being transported by said feeder means as they pass through said test station;

(c) electronic sensing means coupled to said electrical contact means to determine the dircetion of conduction of a diode at said test station, said electronic sensing means producing a first predetermined electrical output when the diode at said test station is oriented in one direction with respect to its direction of conduction and a second predetermined electrical output when the diode at said test station is oriented in the other direction with respect to its direction of conduction;

(d) first diode directing means selectively movable to said second predetermined point for a predetermined short time interval in response to the first predetermined electrical output of said electronic sensing means to receive a diode from said feeder means upon movement of the diode from said test station to said second predetermined point and to eject the diode at a third predetermined point without altering the particular orientation of the diode;

(e) second diode directing means selectively movable to said second predetermined point for a predetermined short time interval in response to the second predetermined electrical output of said electronic sensing means to receive a diode from said feeder means upon movement of the diode from said test station to said second predetermined point and to reverse the orientation of the diode and eject it at a fourth predetermined point; and, (f) a dual inlet channel means for discharge of diodes from said apparatus in the desired orientation, said channel means having a first inlet positioned at said third predetermined point for reception of diodes ejected from said first diode directing means, said channel means having a second inlet positioned at said fourth predetermined point for reception of diode ejected from said second diode directing means, said channel means being adapted to maintain the alignment and orientation of diodes fed to its inlets.

6. Apparatus for orienting a plurality of similarly packaged semiconductor diodes to place the diodes in a predetermined alignment and in a desired orientation with respect to their direction of conduction, said apparatus comprising:

(a) feeder means for receiving said diodes and transporting them from a first predetermined point to a second predetermined point and through a test station intermediate said first and second predetermined points;

(b) sensing means for determining the direction of conduction of a diode at said test station, said sensing means producing a first predetermined output signal when the diode at said test station is oriented in one direction with respect to its direction of conduction and a second predetermined output signal when the diode at said test station is oriented in the other direction with respect to its direction of conduction;

(c) first diode directing means selectively movable to said second predetermined point for a predetermined short time interval in response to said first predetermined output signal of said sensing means to receive a diode from said feeder means at said second predetermined point upon movement of the diode from said test station to said second predetermined point and to eject the diode at a third predeterminated point without altering the particular orientation of the diode;

(d) second diode directing means selectively movable to said second predetermined point for a predetermined short time interval in response to said second predetermined output signal of said sensing means to receive a diode from said feeder means at said second predetermined point upon movement of the diode from said test station to said second predetermined point and to reverse the orientation of the diode and eject it at a fourth predetermined point; and, (e) a dual inlet channel means for discharge of diodes from said apparatus in the desired orientation, said channel means having a first inlet positioned at said third predetermined point for reception of diodes ejected from said first diode directing means, said channel means having a second inlet positioned at said fourth predetermined point for reception of diodes ejected from said second diode directing means, said channel means being adapted to maintain the alignment and orientation of diodes fed to its inlets.

7. Apparatus for orienting a plurality of similarly packaged semiconductor diodes to place the diodes in a predetermined alignment and in a desired orientation with respect to their direction of conduction, said apparatus comprising:

(a) feeder means for transporting diodes individually through a test station and to a predetermined point;

(b) electrical contact means positioned at said test station to establish electrical contacts with diodes being transported by said feeder means as they pass through said test station;

(c) electronic sensing means coupled to said electrical contact means to determine the direction of conduction of a diode at said test station, said electronic sensing means producing a first predetermined electrical output when the diode at said test station is oriented in one direction with respect to its direction of conduction and a second predetermined electrical output when the diode at said test station is oriented in the other direction with respect to its direction of conduction;

(d) first diode directing means selectively movable to said predetermined point in response to said first predetermined electrical output of said electronic sensing means to receive a diode from said feeder means upon movement of the diode from said test station to said predetermined point and eject the diode at a first predetermined remote point;

(e) second diode directing means selectively movable to said predetermined point in response to said second predetermined electrical output of said electronic sensing means to receive a diode from said feeder means upon movement of the diode from said test station to said predetermined point and to turn the diode end-for-end and eject it at a second predetermined remote point; and, (f) dual inlet channel means for discharge of diodes from said apparatus in the desired orientation, said channel means having a first inlet positioned at said first predetermined remote point for reception of diodes ejected from said first diode directing means, said channel means having a second inlet positioned at said second predetermined remote point for reception of diodes ejected from said second diode directing means, said channel means being adapted to maintain the alignment and orientation of diodes fed to its inlets.

8. Semiconductor diode orienting apparatus comprising, in combination:

(a) feeder means for transporting diodes individually through a test station and to a predetermined point;

(b) electrical contact means positioned at said test station to establish electrical contact with diodes being transported by said feeder means as they pass through said test station;

(c) electronic sensing means coupled to said electrical contact means to determine the direction of conduction of a diode at said test station, said electronic sensing means producing a first predetermined electrical output when the diode at said test station is oriented in one direction with respect to its direction of conduction and a second predetermined electrical output when the diode at said test station is oriented in the other direction with respect to its direction of conduction;

(d) first diode directing means selectively movable to said predetermined point for a predetermined time interval in response to said first predetermined electrical output of said electronic sensing means to receive a diode from said feeder means upon movement of the diode from said test station to said predetermined point and reject the diode at a first predetermined remote point; and, (e) second diode directing means selectively movable to said predetermined point for a predetermined time interval in response to said second predetermined electrical output of said electronic sensing means to receive a diode from said feeder means upon movement of the diode from said test station to said predetermined point and eject the diode at a second predetermined remote point.

9. Semiconductor diode orienting apparatus comprising, in combination:

(a) feeder means for transporting diodes individually through a test station and to a predetermined point;

(b) electrical contact means positioned at said test station to establish electrical contact with diodes being transported by said feeder means as they pass through said test station;

(c) electronic sensing means coupled to said electrical contact means to determine the direction of conduction of a diode at said test station, said electronic sensing means producing a first predetermined electrical output when the diode at said test station is oriented in one direction with respect to its direction of conduction and a second predetermined electrical output when the diode at said test station is oriented in the other direction with respect to its direction of conduction;

(d) first diode directing means selectively movable to said predetermined point in response to said first predetermined electrical output of said electronic sensing means to receive a diode from said feeder means upon movement of the diode from said test station to said predetermined point and eject the diode at a first predetermined remote point; and, (e) second diode directing means selectively movable to said predetermined point in response to said second predetermined electrical output of said electronic sensing means to receive a diode from said feeder means upon movement of the diode from said test station to said predetermined point and eject the diode at a second predetermined remote point.

10. Semiconductor diode orienting apparatus comprising, in combination:

(a) feeder means for transporting diodes individually through a test station and to a predetermined point;

(b) sensing means for determining the direction of conduction of an asymmetrically conducting diode at said test station, said sensing means producing a first predetermined output signal when the device at said test station is oriented in one direction with respect to its direction of conduction and a second predetermined output signal when the device at said test station is oriented in the other direction with respect to its direction of conduction;

(c) first device directing means selectively movable to said predetermined point in response to said first predetermined output signal of said sensing means to receive an asymmetrically conducting device oriented in said one direction from said feeder means upon movement of the device from said test station to said predetermined point and eject the device still oriented in said one direction at a first predetermined remote point; and, (d) second device directing means selectively movable to said predetermined point in response to said second predetermined output signal of said sensing means to receive an asymmetrically conducting device oriented in the opposite direction from said one direction from said feeder means upon movement of the device from said test station to said predetermined point and eject the device oriented in said one direction at a second predetermined remote point.

11. Asymmetrically conducting device orientation apparatus comprising, in combination:

(*a*) feeder means for transporting asymmetrically conducting devices individually through a test station and to a predetermined point;

(*b*) sensing means for determining the direction of conduction of an asymmetrically conducting device at said test station, said sensing means producing a first predetermined output signal when the device at said test station is oriented in one direction with respect to its direction of conduction and a second predetermined output signal when the device at said test station is oriented in the other direction with respect to its direction of conduction;

(*c*) first device directing means selectively movable to said predetermined point in response to said first predetermined output signal of said sensing means to receive an asymmetrically conducting device from said feeder means upon movement of the device from said test station to said predetermined point and eject the device at a first predetermined remote point; and, (*d*) second device directing means selectively movable to said predetermined point in response to said second predetermined output signal of said sensing means to receive an asymmetrically conducting device from said feeder means upon movement of the device from said test station to said predetermined point and eject the device at a second predetermined remote point.

References Cited in the file of this patent

UNITED STATES PATENTS

| | | |
|---|---|---|
| 2,967,642 | Curry | Jan. 10, 1961 |
| 2,975,878 | Cason | Mar. 21, 1961 |
| 3,073,446 | Wilson | Jan. 15, 1963 |